United States Patent
Vasic (10) Patent No.: US 6,178,194 B1
(45) Date of Patent: Jan. 23, 2001

(54) CELLULAR MOBILE TELEPHONE SYSTEM (75) Inventor: Dobzica Vasic, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/006,843

(22) Filed: Jan. 14, 1998

(30) Foreign Application Priority Data

Jan. 16, 1997 (JP) .................................................. 9-005667

(51) Int. Cl.⁷ .................................................. H04B 15/00
(52) U.S. Cl. ........................ 375/136; 375/32 B; 375/316; 375/342
(58) Field of Search .................................... 375/136, 137, 375/147, 148, 326, 341, 342, 343, 316; 455/63, 226.1, 516, 517

(56) References Cited

U.S. PATENT DOCUMENTS

| | | | |
|---|---|---|---|
| 5,056,109 | 10/1991 | Gilhousen et al. | 375/1 |
| 5,109,390 | 4/1992 | Gilhousen et al. | 375/1 |
| 5,151,919 | 9/1992 | Dent | 375/1 |
| 5,237,586 | 8/1993 | Bottomley | 375/1 |
| 5,594,757 * | 1/1997 | Rohani | 375/344 |
| 5,905,946 * | 5/1999 | Lilleberg et al. | 455/63 |

FOREIGN PATENT DOCUMENTS

| | | |
|---|---|---|
| 5-268128 | 10/1993 | (JP) . |
| 7-46284 | 2/1995 | (JP) . |
| 7-066760 | 3/1995 | (JP) . |
| 7107033 | 4/1995 | (JP) . |
| 7-202757 | 8/1995 | (JP) . |
| 7-202843 | 8/1995 | (JP) . |
| 7-221700 | 8/1995 | (JP) . |
| 7-226710 | 8/1995 | (JP) . |
| 8-32515 | 2/1996 | (JP) . |
| 8-079130 | 3/1996 | (JP) . |
| 1013364 | 1/1998 | (JP) . |
| 1098431 | 4/1998 | (JP) . |

* cited by examiner

Primary Examiner—Stephen Chin
Assistant Examiner—Mohammad Ghayour
(74) Attorney, Agent, or Firm—Ostrolenk, Faber, Gerb & Soffen, LLP (57) ABSTRACT A cellular mobile telephone system includes a first carrier estimation stage that estimates carrier signals using pilot symbols that have been inserted a signal received by the telephone system. The pilot symbols have a known code pattern. The first carrier estimation stage produces a data symbol train. A second carrier estimation stage estimates the carrier signals using the data symbol train and the pilot symbols. In this way, the telephone system can reproduce a highly precise carrier used in coherent detection in a cellular mobile CDMA system.

17 Claims, 5 Drawing Sheets

CELLULAR MOBILE TELEPHONE SYSTEM

BACKGROUND OF THE INVENTION

1. Field of the Invention

The present invention relates to a cellular mobile telephone system and, particularly, to a power control for a closed loop transmitter power control in a code division multiple access (CDMA) cellular mobile telephone system. In more detail, the present invention relates to a technique for carrier synchronization in a coherent detection data communication system.

2. Description of Related Art

CDMA is a modulation and multiple access technique based on spread spectrum communication that has been used to improve the capacity in digital cellular radio communication systems. Code division multiple access using a direct sequence (for convenience, herein called CDMA) is one technique which faciliates communication in systems where a large number of system users are present. In the CDMA system, all the users employ the same code for encoding and decoding of their respective information sequence. Transmitted signals in the common spectrum are distinguished from one another by superimposing a different pseudorandom pattern, also called a code, on each transmitted signal. Thus, a particular receiver can recover the transmitted information intended for it by knowing the pseudorandom pattern, i.e., the key, used by a corresponding transmitter.

The cellular mobile channel typically can be characterised by two separate phenomena, average path loss and fading. The average path loss can be described statistically by a log normal distribution whose mean is proportional to the inverse fourth power of the path distance. The second phenomena has a Rayleigh fading characteristic. The Rayleigh fading process is caused by the physical environment and results in copies of the signal arriving simultaneously from many directions with different transmission delays. This causes significant phase differences between the paths with the possibility for destructive summation, resulting in deep fades. Fading is very disruptive to the channel, and results in poor communications. While Rayleigh fading may be independent for forward (cell-to-mobile) and reverse (mobile-to-cell) links, log-normal shading normally will exhibit reciprocity.

Rapid fading is a basic problem in digital mobile communications. With respect to electric power efficiency, coherent detection schemes are superior compared with the differentially coherent or noncoherent detection. However, carrier recovery, which is necessary for coherent detection, suffers from the time-variant nature of fading channels. The power efficiency obtained by coherency in digital communication systems can be improved only when a carrier synchronization unit is provided in the receiver. Due to implementation considerations and lack of a robust phase estimation algorithm, differential detection or other non-coherent techniques have historically been used in fading channels.

Significant performance improvements can be achieved if near coherent demodulation is realized. A linear modulation scheme such as multi-phase shift keying (M-PSK) or multi-quadrature amplitude modulation (M-QAM) employ coherent reception potentially from highly favorable communications schemes. The power advantage of coherent detection over non-coherent detection remains or is actually enhanced when channel coding or co-channel interference are considered. When the channel is corrupted by Rayleigh fading, resulting in a rapidly varying channel phase, an efficient carrier synchronization unit which derives a carrier signal from the received signal is essential for successful detection. The efficient carrier synchronization is particularly important in a CDMA system for reverse link where a common pilot channel could not be afforded.

Power control is a very important system requirement for a CDMA system, since only by controlling the power of each user can, resources be shared equally among users and the capacity maximized. In order to maximize the capacity of CDMA system in terms of the number of simultaneous calls in a given system bandwidth, the transmitted power of each mobile unit is controlled so that its signal arrives at the cell site with the minimum required signal-to-interference ratio. Power control is essential in any CDMA system in order to mitigate the "near/far problem" and thereby preventing users that are geometrically closer to the base station from "overpowering" users that are farther away. Furthermore, the nature of fading channels causes power variation that must be compensated if it is possible. To equalize the received powers, a combination of an open and closed loop is used. The goal of the open loop is to adjust the transmitted power according to changes in received power. For a reverse link open loop, the mobile stations measure the received power level from the cell sites and adjust their transmitter power in an indirectly proportional manner, in an attempt to have all mobile station transmitted signals arrive at the cell site with the same nominal power level. The open loop control can cope with the very slow shadow type fading.

In the power control in the reverse link, the base station measures the related receiving power level or more precisely measures Eb/Io (ratio of signal energy per bit Eb, to interference power spectral density lo) of the respective related mobile stations and compares the measured ratios with an adjustable threshold. A determination is made to transmit a power-up command or a power-down command to the mobile station. The power adjustment command signals the mobile station to nominally increase or to decrease the mobile station transmit power by a predetermined amount. The rate of power adjustment command transmission must be high enough to permit tracking of slow Rayleigh fading, approximately 1000 commands per second. The power adjustment command is sent to the mobile station in the forward channel addressed to the mobile station. The mobile station combines the received adjustment commands with an open loop estimate to obtain the final value for the transmitted radiated power.

The goal of the closed loop is to provide rapid corrections to the open loop estimate in order to maintain the optimal transmit power. This close loop correction accomodates gain tolerance and unequal propagation losses between the forward and reverse links. The variations in relative path losses and shadowing effects will generally be slow enough to be controlled. The slow Rayleigh fading could be controlled too. However, the variation associated with fast Rayleigh fading could be too rapid to be tracked by power control. It is known that effectiveness of the combination of interleaving and coding in combating the effects of power variation due to slow Rayleigh fading is reduced. At low speed (slow fading) the power control reacts to compensate for fading. The power control and interleaving/coding are most effective in complementary parameter regions, thus providing a degree of robustness for both fast and slow Rayleigh fading. Another benefit of power control is that each user transmits only as much energy as is required, thus prolonging battery life in portable transmitters.

The bit-error-rate/frame-error-rate(BER/FER) performances in a CDMA system are directly related to the closed loop power control efficiency in combating the effects of received power variation. Further, by controlling the power, unnecessary system interference is minimized, increasing overall system capacity. The accuracy of Eb/Io measurement for the purpose of closed loop power control is essential for CDMA cellular system performance, so that a receiver could overcome deleterious fading, providing a required degree of robustness. The Eb/Io measurements for low signal to interference ratios suffer high degradation and introduce errors in power control. For precise power control, accurate and reliable Eb/Io measurements are required.

In a coherent detection data communication system for the reverse link, the known pilot symbols are usually inserted and periodically transmitted with data symbols. The receiver interpolates the channel measurement provided by the pilot symbols to obtain a phase and amplitude reference for coherent detection. The transfer function of the channel is estimated by using the pilot symbols and the data symbols are detected on the basis of the estimated transfer function. However, ordinary symbols interpolations like linear interpolation, low-pass filter interpolation and Gaussian interpolation, have redundancy and could not accurately estimate fading multiplicative distortion without a pilot symbol rate increase. The same pilot symbols are used for Eb/Io measurements. In order to minimize losses caused by the transmission of the pilot symbols, the ratio of the transmitted pilot symbols to the transmitted data symbols is usually low, and using only pilot symbols for Eb/Io measurements could not always satisfy requirements for accurate Eb/Io measurement.

When the number of pilot symbols per slot is small, it is impossible to precisely estimate signal power (S) and interference power (I) for the purpose of closed-loop power control by using only pilot symbols. The usage of data decisions and carrier estimates obtained by an ordinary interpolation for power measurements a significant improvements compared with the case where only the pilot symbols are used. According to this method, the re-modulated signal, that is, the interpolated reference, is calculated by using the decisions and estimated carriers. Signal power is calculated by using the re-modulated signal. The interference power is calculated by using difference between the received signal and the re-modulated signal. However, the usual estimation of the carrier using the usual ordinary pilot interpolation suffers a degradation for low signal power to interference power ratio (S/I) and further improvement in Eb/Io measurement is possible if the carrier signal could be estimated more accurately.

Further, when the number of pilot symbols per slot or frame is small and the S/I ratio is low, particularly for a high diversity order when S/I ratio per path is low, the carrier estimation error of an ordinary pilot interpolation becomes large and the degradation in carrier estimation causes a degradation in receiver BER performance.

SUMMARY OF THE INVENTION

An object of the present invention is to provide a novel and improved method for closed loop transmitter power controlling in a cellular mobile system. The method according to the present invention may be used to control transmitter power of the closed loop transmitter in the reverse link of a system using the coherent detection schemes.

Another object of the present invention is to provide a novel and improved method of a carrier synchronization.

Power control is very important for the CDMA system. In order to obtain favorable effects in communication capacity, quality and other benefits, the CDMA system uses a tight power control. The power control extenuates unnecessary system interference which influences the whole system capacity.

The reliability and accuracy of the Eb/Io measurement is indispensable in the closed loop power control. The present invention proposes a novel and improved method for measuring the Eb/Io. According to the proposed method, a precise power control is realized, resulting in an improved BER/FER performance of a receiver and a reduced receiving power deviation, that is, power control error. Therefore, the system capacity is increased.

The carrier recovery, that is, carrier synchronization, required in the coherent detection is influenced by the time varying characteristic of the fading channel. According to the present invention, the carrier tracking performance in the pilot symbol interpolation method is improved to thereby reduce the number of required pilot symbols.

The Eb/Io measurement and the carrier estimation are extended to include a data symbols decision. In the present invention, the data symbols and the pilot symbols are divided to frames or slots. On the basis of the measured Eb/Io value in one slot, a power up or power-down command is transmitted to a mobile station. The carrier signal is estimated for each received path by using the interpolated pilot symbols. The estimated carrier is used to perform a combination and pre-detection of the coherent diversity in a Rake receiver architecture in which signals in all of the communication paths are combined in phase. The pre-detection is performed for further estimation and a result of the pre-detection is not coincident with a result of an actual detection. The data symbols detected by the pre-detection are used to remove modulation of a receiving signal or demodulate the receiving signal in order to provide conditions for the measurement and estimation in the second stage. In the second stage, the carrier and power estimations are performed. Symbols or samples from each slot are divided to a plurality of groups so that the signal during period of one group could be considered quasi-static. An accumulation and averaging of samples in each group is performed to estimate the carrier and the S/I. In order to obtain an estimated carrier value, the accumulation values and the average values from all of the symbol groups are interpolated. The estimated carrier is also an estimated value of the receiving signal which is demodulated. By using the signal thus estimated, the signal power is calculated. The interference signal is estimated as a difference between the receiving signal and the estimated signal. The result of estimation in the second stage is used in both the carrier recovery and the Eb/Io measurement in an actual detection.

When the receiver is operating in a region of reasonable symbol error, the accuracy and reliability of the estimated Eb/Io value is improved by using data symbol decisions. When the number of samples is increased by including the data symbols for measurement, the measurement error of Eb/Io is reduced. The measurement error of Eb/Io is further substantially reduced by the estimation performed in the second estimation. The data symbols are effective in the estimation of both the Eb/Io and the carrier signal. It is possible to reduce the amount of calculation and the complication by commonly processing the carrier estimation and the Eb/Io measurement.

As mentioned above, it is possible to indirectly improve the closed loop power control performance and the carrier tracking performance by including the data symbols determined in the first stage estimation and performing the proposed second stage estimation. In the second stage estimation, the symbols are divided to a plurality of groups and the Eb/Io is estimated by estimating the carrier signal, and the accumulation and averaging of the symbols are performed for every group. Deviation of the receiving signal power becomes smaller compared with that based on the single step estimation. Further, since the possibility of over-estimation of the Eb/Io for a low S/I and higher order variety is reduced according to the present method, the Eb/Io can be controlled to a smaller value. Further, by dividing the samples of the groups, the estimation error in one group influences only that group and does not influence the estimation of the whole slots. Thus, the BER performance and the performance of the whole receiver are improved. According to the present method, it is possible to reduce the number of the pilot symbols, or to widen a gap between the adjacent pilot symbols and, therefore, the efficiency of the system is improved.

DETAILED DESCRIPTION OF PREFERRED EMBODIMENTS

Figure 1:
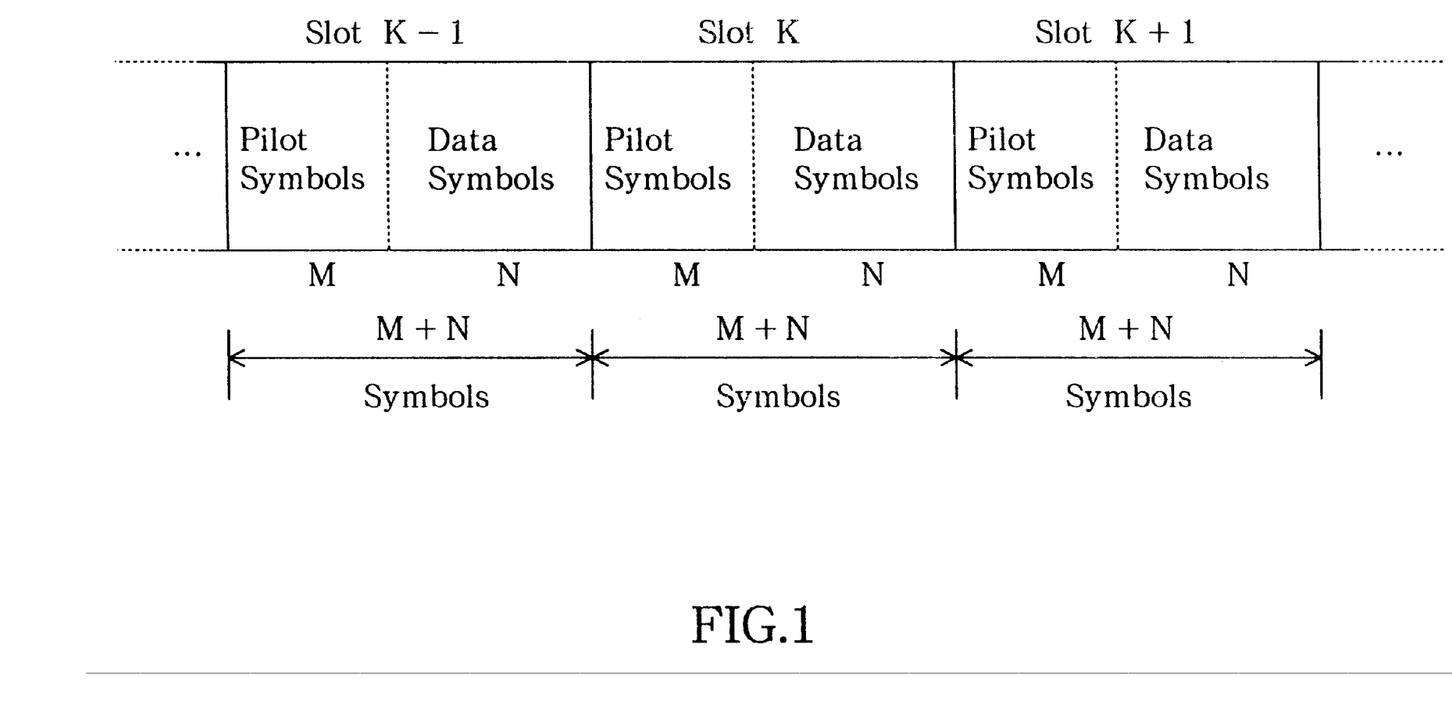
FIG. 1 shows a frame format of a transmission signal.
Figure 5:
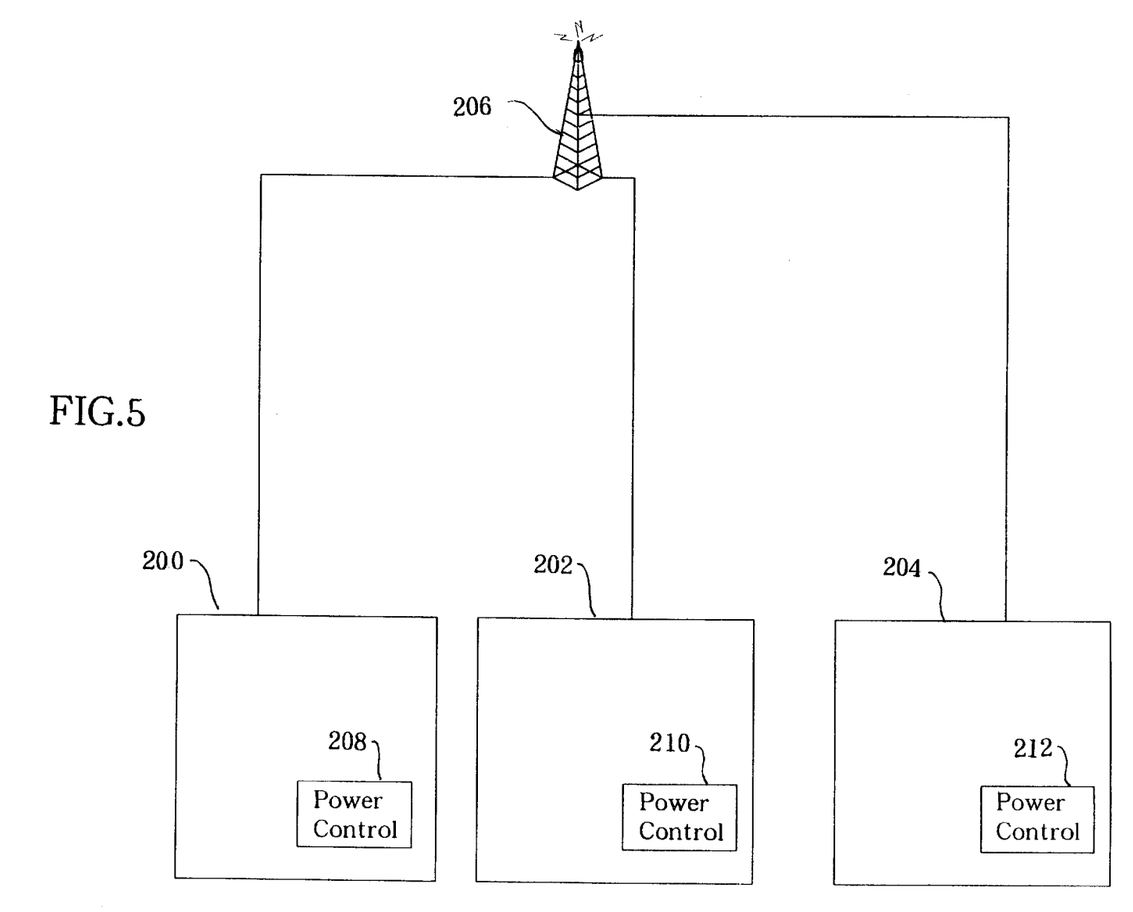
FIG. 5 is a block diagram of a cellular mobile telephone system.

FIG. 1 shows a frame format to be used for a signal transmission, according to the present invention. Referring also to FIG. 5, a transmitter in each mobile station 200, 202, 204 inserts known symbols, that is, pilot symbols, into a transmission signal coherently. A receiver on the side of a cell device 206 extracts samples corresponding to the pilot symbols, by using the pilot symbols, and interpolates the samples. With this interpolation, an estimation value of transfer function of a fading channel is obtained. This is equivalent to an estimation of a carrier. The same pilot symbols are used in a closed loop power control processing for Eb/Io measurement. The transmitter of each mobile station transmits first M pilot symbols, then N data symbols, and new M pilot symbols and so on, that order. The N/M ratio is preferably larger than 15 and transmission loss caused by the pilot symbol insertion can be negligible as a result. The number M of the pilot symbols in each frame or slot is usually 1 to 5. When M is larger than 1, samples corresponding to the pilot symbols in one slot are accumulated and averaged. By averaging the samples, the influence of accompanying noise or influence of interference are substantially reduced. By using these averaged samples in the interpolation processing, performance of a system for interpolating the pilot symbols is improved.

In the present invention, the Eb/Io value is measured in an interval of one slot and a power control command is transmitted to the mobile station to regulate transmission power thereof once in every slot period. In some cases, in order to improve the estimation of a carrier, additional pilot symbols may be inserted into an intermediate portion of each slot. The present invention can be applied to such a case.

Figure 2:
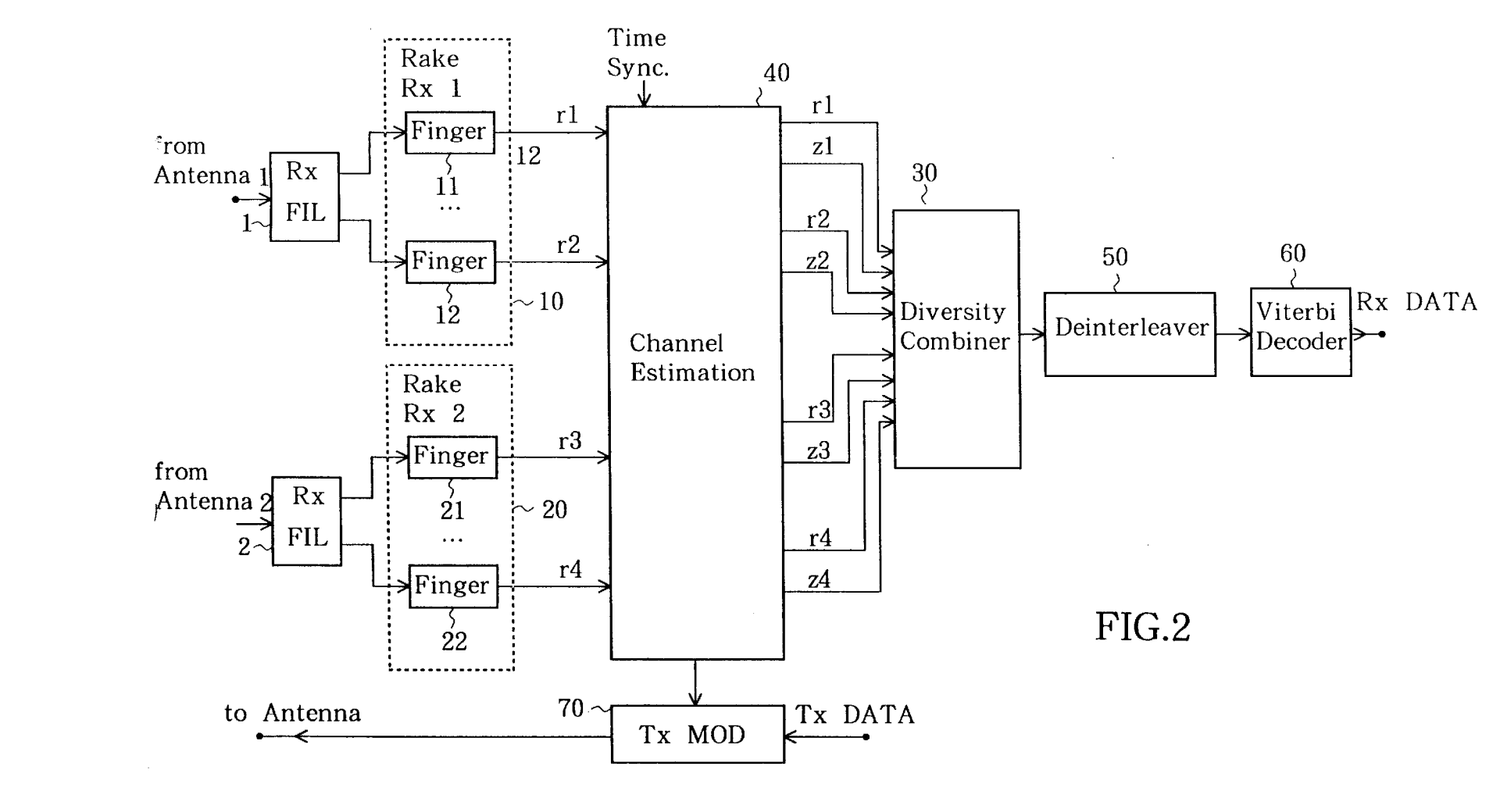
FIG. 2 is a block diagram of a CDMA transmitter and receiver of a cell device, showing a portion thereof related to a closed loop power control and carrier synchronization according to the present invention.

Before describing the present method of the closed loop power control and carrier estimation in detail, an arrangement and purpose of the channel estimation unit will be described briefly with reference to FIG. 2 which is a block diagram of a receiver/transmitter of a cell device for performing the power control and carrier estimation according to the present invention. The receiver/transmitter shown in FIG. 2 is used to communicate with a specific mobile station. A CDMA receiver portion of the receiver/transmitter shown in FIG. 2 performs diversity combining, coherent detection, release of interleaving and soft decision Viterbi decoding. In FIG. 2, a processing at a baseband frequency is mainly shown. Other processing such as processings at RF and IF frequencies, up/down conversion processing, timing recovery processing and other processings are not shown. In FIG. 2, the diversity reception is performed through two communication paths each including an antenna (not shown) and a receiving system. Reference numerals 1 and 2 depict receiving filters provided between the antennas and the receiving systems, respectively. The receiving systems include RAKE receivers 10 and 20, respectively, which receive signals arriving at the respective antennas with different delays through the respective receiving filters 1 and 2. The RAKE receiver 10 includes a plurality of RAKE fingers (11, 12) and the RAKE receiver 20 includes a plurality of RAKE fingers (21, 22). The RAKE fingers remove the spreading of the spectrum of an information signal, respectively. A channel estimation unit 40 extracts phases and amplitudes from received signals supplied from the RAKE receivers 10 and 20. In a first stage, the channel estimation unit 40 interpolates channel measurement values given by the pilot symbols to obtain a reference carrier for pre-detection. From the pre-detection, hard data is determined by a second stage carrier estimation and signal power and interference power measurements. The thus obtained reference carrier is used in the detection performed in the second stage. A diversity combiner 30 coherently combines the path signals in a direction in which the signal /interference ratio becomes maximum. An output of the diversity combiner 30 is supplied to a deinterleaver 50. A soft decision Viterbi decoder 60 determines the most probable information train.

The channel estimation unit 40 further measures Eb/Io for a specific mobile station. In response to the measured Eb/Io level, the channel estimation unit 40 further generates a power adjustment command which is supplied to a transmitter modulator 70. As mentioned previously, bits of the power adjustment command are used in a related mobile station to regulate a transmission power. The power adjustment command instructs the mobile station to increase or decrease transmission power by a predetermined amount (step size) of about 1.0 dB. When the received Eb/Io measurement value is smaller than a preset level given by a cell device processor (not shown), a command bit is generated to indicate that an increase of transmission power of the mobile station is necessary. Similarly, when the received measurement value is larger than the preset level, the power adjustment command instructs the mobile station to reduce the transmission power. The transmitter modulator 70 spread-spectrum- modulates an information signal designated to a user to transmit to a specific mobile station. The transmitter modulator 70 further receives a power adjustment command bit from the channel estimation unit 40 and spread-spectrum modulates these bits for a transmission to the mobile station. (See FIG. 5). Each mobile station has a respective power control 208, 210, 212 which receives this information and regulates the power of the transmission signal produced by the respective mobile station in response thereto.

A signal power and an interference power are measured by using pilot symbols received during a 1 pilot symbol period of M samples which are accumulated and averaged. In order to perform the carrier estimation, the same pilot symbols are accumulated and averaged. If an accumulation distortion due to fading is constant over the pilot period of M pilot symbols, the modulation is removed by rotating the receiving samples suitably. In order to rotate the receiving samples, the known pilot symbols are used. All of the pilot symbols are rotated such that vectors of the pilot symbols are made in the same direction so that the accumulation and averaging of the pilot symbols are possible. The average value is calculated as an estimated carrier. Power having a average value thus calculated is an estimation value of the signal power. The interference power is obtained by measuring a difference between the rotated receiving signal and the calculated average value.

The Eb/Io measurement and the carrier estimation by means of accumulation and averaging of the pilot samples will be further described. The linearly modulated baseband receiving signal $\{r1, r2, \ldots, rM\}$ is represented in the form of complex numbers as follow:

$$r1 = c1 a1 + n1$$
$$r2 = c2 a2 + n2$$
$$\vdots$$
$$rM = cM aM + nM$$

where $\{c1, c2, \ldots, cM\}$ are carrier signals, $\{n1, n2, \ldots, nM\}$ are interference signals (including noise), $\{a1, a2, \ldots, aM\}$ are pilot symbols, and M is the number of pilot symbols.

All signals are represented by complex numbers having in-phase and quadrature (I/Q) components.

When the pilot symbols are rotated suitably, the following are obtained:

$$r1\_R = c1 + n1\, a1^*$$
$$r2\_R = c2 + n2\, a2^*$$
$$\vdots$$
$$rM\_R = cM + nM\, aM^*$$

where * represents complex conjugate and $$a1\, a1^* = a2\, a2^* = \ldots = aM\, aM^* = 1,$$

that is, the multiple phase shift keying (M-PSK) modulation. The mean value is calculated by averaging as follows:

Mean=C1=(1/M)(r1__R+r2__R+ . . . +rM__R)=(1/M)(c1+c2+ . . . +cM)+(1/M)(n1 a1*+n2 a2*+ . . . +nM aM*)

The estimated signal power S is given by the following equation:

S=Mean·Mean* and the estimated interference power I is given by the following equation:

I=(1/M){(r1__R−Mean)(r1__R−Mean)*+ . . . +(rM__R−Mean)(rM__R−Mean)*}

The estimated mean value is the estimated value of the carrier signal as shown by C1. If C1 is a carrier estimated by using M pilot symbols of a current slot and C0 is a carrier estimated by using M pilot symbols of a preceding slot, the carrier signal can be interpolated by using the usual linear interpolation as follows:

Pm=[1−(m/K)]C0+(m/K)C1 where M=0, 1, 2, . . . , k−1 and

K=N+M, that is, K is the number of symbols in each slot.

Although the example using the linear interpolation has been described, a higher order interpolation may be applied. Since it is possible to reliably detect the phase difference between the transmission signal and the receiving signal by using the known pilot symbols, the coherent detection of absolute phase is possible.

When the number of pilot symbols in each slot is large, the measurement error of Eb/Io is reduced and, therefore, the estimation error of the carrier is reduced with an increase of the number M of the pilot symbols in each slot. However, the number of pilot symbols in each slot is limited in order to minimize loss due to transmission of these pilot symbols. In order to reduce the estimation error, it is necessary to increase the number of samples by including the data symbols for the power measurement.

The diversity combining is a preferable method to reduce the influence of fading. There are two methods to be used in the Eb/Io measurement in the diversity combining. One of the methods is to measure Eb/Io of the diversity combined signal and the other method is by measuring Eb and Io for every communication path and adding and averaging the thus obtained Eb's and Io's. The first method using the diversity combining signal has some advantages under practical conditions that the Eb/Io value is small and the number of communication paths is dynamically changed. A relation between the Eb/Io of the combining signal and the BER does not depend substantially on the condition of the communication path. However, the second method can measure power more reliably by measuring Eb and Io every communication path and adding and averaging all Eb's and Io's to estimate Eb/Io. According to the second method, power is controlled such that the Eb/Io value becomes small. Therefore, the influence of the carrier estimation error on the Eb/Io measurement becomes smaller. Further, since the carrier estimation unit can be used commonly to measure the transmission power in the respective communication paths, the use of the second method does not make the system so complicated. For these reasons, the second method is preferable in order to measure the Eb/Io value according to the present invention. However, the first method may be used in lieu of the second method. The second method which uses the communication path signals will be further considered.

The diversity combining can be extended as follows:

Considering only two communication paths (a, b) with using the same notation,

In the first communication path (a):

$\{r1a, r2a, \ldots, rKa\}$ are receiving modulation signals, $\{p1a, p2a, \ldots, pKa\}$ are carrier signals extracted from the interpolated pilot symbols, In the second communication path (b):

$\{r1b, r2b, \ldots, rKb\}$ are receiving modulation signals, $\{p1b, p2b, \ldots, pKb\}$ are carrier signals extracted from the interpolated pilot symbols, where K is all symbols in every slot and the carrier signal is extracted by the usual linear interpolation as mentioned previously.

The receiving signals $\{r1c, r2c, \ldots, rKc\}$ after the diversity combining and the maximum ratio combining thereof are added is represented by the following equations:

$$r1c = r1a\,p1a + r1b\,p1b$$
$$r2c = r2a\,p2a + r2b\,p2b$$
$$\vdots$$
$$rKc = rKa\,pKa + rKb\,pKb$$

These can be generalized to higher order diversity.

The hard decision data $\{d1, d2, \ldots, dN\}$ is obtained by using the receiving signals $\{r1c, r2c, \ldots, rKc\}$. This hard decision data is obtained for the second stage carrier estimation and is different from the actual detection data. The reliability of the decided data is improved by using the signals which are diversity combined. Since these hard decision data symbols are combined with the known pilot symbols, data/pilot vectors $\{d1, d2, \ldots, dN\}$ are formed for the second stage estimation. The second stage estimation for a specific communication path will be described.

The samples of the communication path signals $\{r1, r2, \ldots, rK\}$ are suitably rotated to remove the modulation. In order to rotate these samples, the data/pilot vectors $\{d1, d2, \ldots, dN\}$ are used. With such rotation, the continuous samples are arranged in the same direction for a further accumulation and averaging. After the rotation, the following signals $\{r1\_R, r2\_R, \ldots, rK\_R\}$ are obtained:

$$r1\_R = r1\,d1^*$$
$$r2\_R = r2\,d2^*$$
$$\vdots$$
$$rK\_R = rK\,dK^*$$

The rotated samples $\{r1\_R, r2\_R, \ldots, rK\_R\}$ are divided to three groups (a, b, c) each including L symbols, that is, K=3L. The vectors $\{r1\_R, r2\_R, \ldots, rK\_R\}$ can be described as follow:

$$\{r1\_R, r2\_R, \ldots, rK\_R\} = \{\{ra1\_R, ra2\_R, \ldots, raL\_R\}, \{rb1\_R, rb2\_R, \ldots, rbL\_R\}, \{rc1\_R, rc2\_R, \ldots, rcL\_R\}\}$$

Assuming that the fading accumulation distortion is constant throughout a time period corresponding to L symbols, the mean value is calculated for every group by using the accumulation and averaging.

$$\text{Mean\_a} = C\_a = (1/L)\{ra1\_R + ra2\_R + \ldots + raL\_R\}$$
$$\text{Mean\_b} = C\_b = (1/L)\{rb1\_R + rb2\_R + \ldots + rbL\_R\}$$
$$\text{Mean\_C} = C\_c = (1/L)\{rc1\_R + rc2\_R + \ldots + rcL\_R\}$$

The second stage carrier signal estimation values $\{z1, z2, \ldots, ZK\}$ are generated by interpolating the accumulated and averaged values $C\_a$, $C\_b$, $C\_c$. In this embodiment, the linear interpolation is applied to a range between two continuously calculated mean values. In order to cover all samples in the whole slot, the interpolation is extended to a boarder of the slot. The estimated values $\{s1\_R, s2\_R, \ldots, sK\_R\}$ of the rotated receiving signals (modulation is removed) are equivalent to the estimated carrier signals and the following equation is established:

$$\{s1\_R, s2\_R, \ldots, sK\_R\} = \{z1, z2, \ldots, zK\}$$

The interference signals $\{i1, i2, \ldots, iK\}$ are estimated as the difference between the rotated signals $\{r1\_R, r2\_R, \ldots, rK\_R\}$ and the estimated signals $\{s1\_R, s2\_R, \ldots, sK\_R\}$ and represented by the following equation:

$$\{i1, i2, \ldots iK\} = \{r1\_R, r2\_R, \ldots, rK\_R\} - \{s1\_R, s2\_R, \ldots, sK\_R\}$$

The signal power S is estimated by the power of estimated signals $\{s1\_R, s2\_R, \ldots, sK\_R\}$ and the interference signal power I is estimated by the power of the interference signal $\{i1, i2, \ldots, iK\}$.

This can be generalized by using the number of groups, which is other than 3. The signals of each group are estimated in the above description as quasi static. The number of groups, which is suitable, depends upon fading frequency and frequency drift caused by the incompleteness of the automatic frequency control (AFC). The number of symbols in each group must be as large as possible under the given conditions. The estimated power and the estimated interference power in the all communication paths are combined to calculate all Eb/Io for the closed loop power control.

Figure 3:
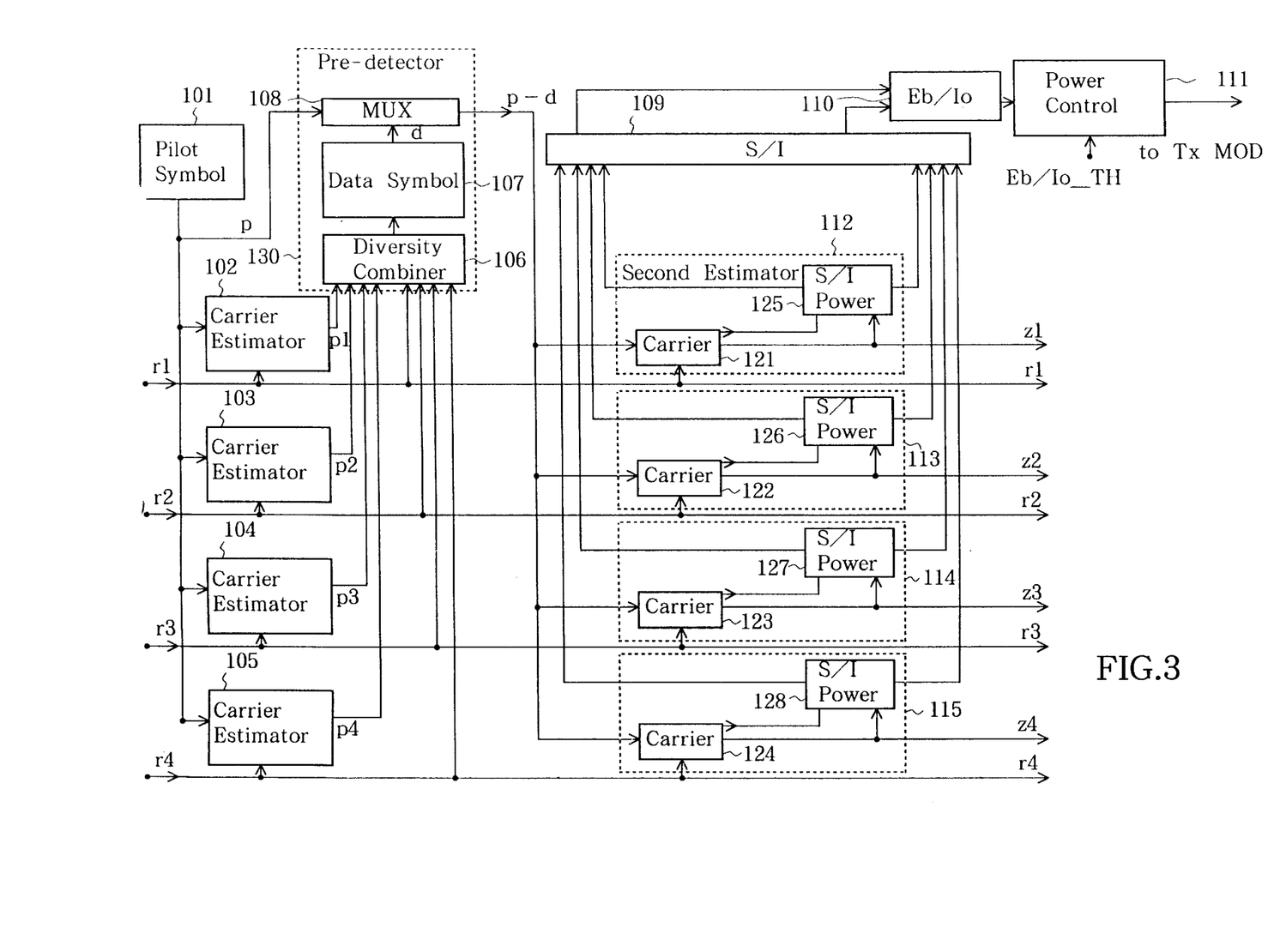
FIG. 3 is a block diagram of a typical channel estimation unit to which the present invention is applied.

FIG. 3 shows in detail the channel estimation unit 40 shown in FIG. 2 to explain the processing performed by the channel estimation unit 40. In FIG. 2, the channel estimation unit 40 uses as the input signals baseband signals (signals r1 to r4) of the respective communication paths in the RAKE receivers, which are represented by complex numbers. Although four communication paths are shown in FIG. 2, it can be easily generalized to any number of fingers and communication paths. The carrier estimation unit 40 transfers the same communication path signals r1 to r4 to the diversity combiner 30. The carrier estimation signals z1 to z4 from the carrier estimator unit 40 are also supplied to the diversity combiner 30 as the output representing the coherent maximum rate combining and a result of the actual detection. The channel estimator unit 40 further outputs the power up/down command bit as the output for the closed loop power control, as mentioned previously.

Referring to FIG. 3, the channel estimation unit 40 includes first stage carrier estimators 102 to 105, a pre-detector 130, second stage estimators 112 to 115, an Eb/Io calculator 110 and a closed loop power control command generator 111. The input vectors for the respective communication paths are modulated complex baseband receiving signals (in the case of 4 fingers shown in FIG. 3, signals r1 to r4).

In order to obtain the reference phase and the reference amplitude to be used in the pre-detection, the first stage estimators 102 to 105 interpolate the channel measurement values given by the pilot symbols. The estimated carrier signals p1 to p4 are input to the diversity combiner 106. The diversity combiner 106 combines the communication path signals coherently. The diversity combiner 106 corrects the fading accumulation distortion and weighs the communication path signals suitably to maximize the signal power to interference power ratio. The combined signal is supplied to a data symbol pre-detector 107. The data symbol pre-detector 107 performs a hard decision and outputs preparatively detected data symbols. A multiplexer 108 combines the preparatively detected data symbols and the known pilot symbols to form pilot/data symbols vectors p_d for the second stage estimation. The pilot/data symbols p_d are used in the second stage estimation to remove the modulation.

The second stage estimation is executed for every communication path by using the second stage estimators 112 to 115. The respective communication path estimators include second stage carrier estimators 121 to 124 and signal to interference power ratio estimators 125 to 128. The second stage carrier estimators 121 to 124 produce the carrier signals z1 to z4 for actual detection. The signal to interference power ratio estimators 125 to 128 measure the signal power and interference power. All signal powers and interference powers measured by the signal power to interference power ratio estimators are supplied to the signal to interference power ratio calculator 109. The signal to interference ratio calculator 109 combines these measured powers and calculates a ratio of the sum of the measured signal powers to the sum of the measured interference powers. The resultant signal power to interference power ratio is converted into an estimated Eb/Io by the Eb/Io calculator 110. The estimated Eb/Io is supplied to the power control command generator 111. The power control command generator 111 compares the estimated Eb/Io with a threshold value (EbIo_TH) preliminarily set with respect to a desired Eb/Io. The threshold value EbIo_TH is set by a control processor (not shown). The power control command generator 111 generates a power control bit on the basis of a result of this comparison and instructs the mobile station to reduce or increase the transmission power of the mobile station. The power control command bit is combined with a data bit in the transmitter modulator and transmitted to the mobile station as mentioned previously.

Figure 4:
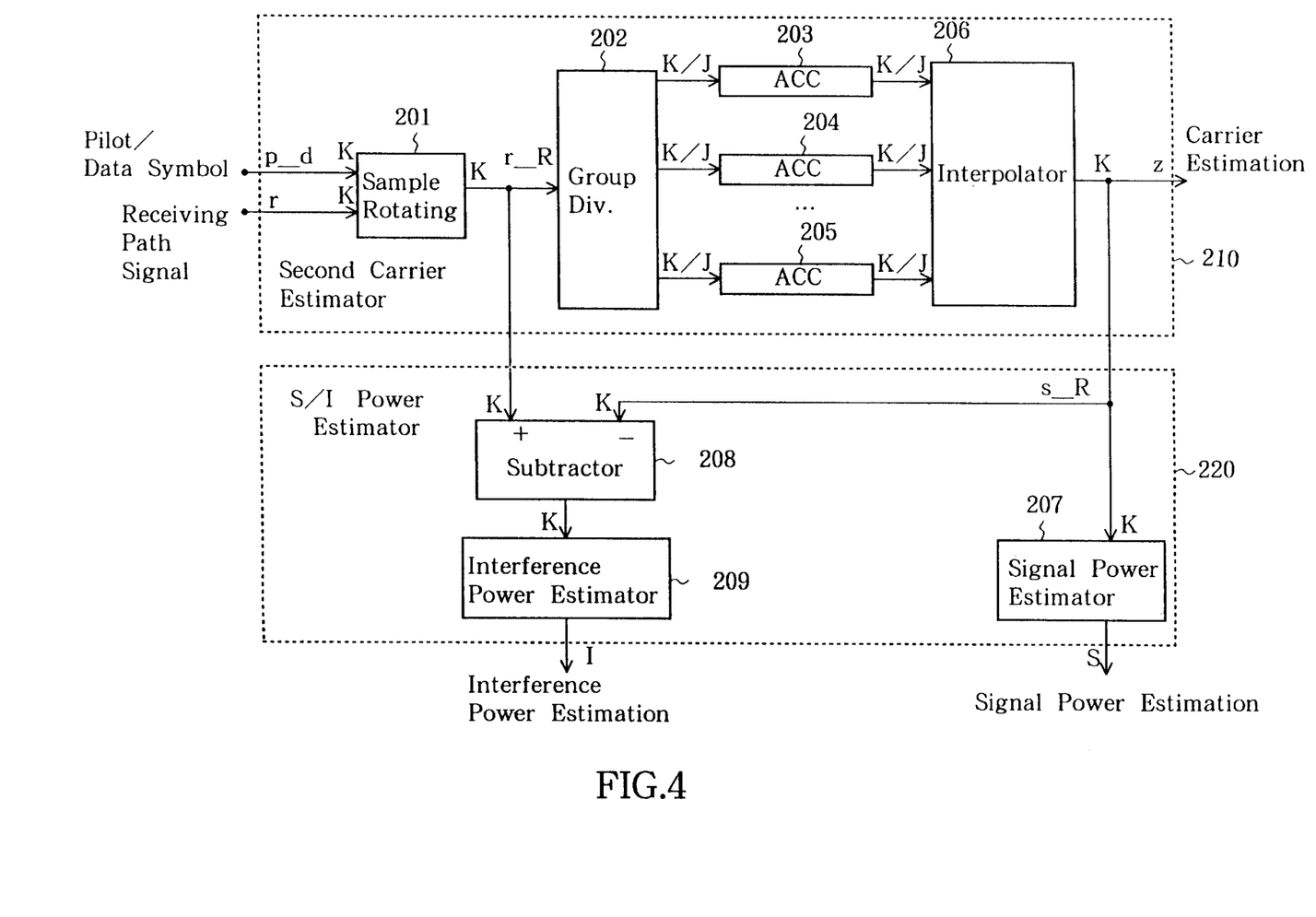
FIG. 4 is a block diagram showing, in detail, a circuit construction for performing a second stage carrier estimation and a signal/interference power measurement used in the channel estimation unit shown in FIG. 3.

FIG. 4 shows one of the second stage estimators 112 to 115 in more detail. The second stage estimator includes a second carrier estimator 210 and a signal power to interference power ratio estimator 220. The second stage carrier estimator 210 includes a sample rotation circuit 201, a group divider 202, accumulators 203 to 205 and an interpolator 206. The signal power to interference power ratio estimator 220 includes a signal power estimator 207, a subtractor 208 and an interference power estimator 209.

The sample rotation circuit 201 rotates all of K samples in one slot by using the pilot symbols and the preparatively detected data symbols. The rotation is executed by complex-multiplication of the receiving samples r={r1, r2, . . . rK} at respective points. In this case, complex conjugate data and the pilot symbols are represented by conjugate format p_d= {d1, d2, . . . , dK}. The data symbols are decided by the pre-detection process. The rotated samples r_R={r1_R, r2_R, . . . , rK_R} are divided to J groups by the block divider 202 and so each group includes K/J samples.

Accumulation and averaging of the samples in these groups are executed by the accumulators 203 to 205. The interpolator 206 interpolates the accumulated and averaged values obtained by the accumulators 203 to 205 to form the estimated carrier values z={z1, z2, . . . , zK}. The estimated carrier values z are used for the coherent detection. These estimated carrier values are also estimation values of the rotated receiving signals after modulation is removed, that is, s_R. The signal power estimator 207 calculates the signal power S by using the estimated values of the rotated receiving signals s_R. The subtractor 208 calculates a difference between the rotated signals r_R and the estimated rotation signals s_R. The calculated difference is the estimated values of the interference signals. On the basis of such estimated interference signal i, the interference power estimator 209 calculates the interference power I.

As described hereinbefore, according to the present invention, the novel and improved method for Eb/Io measurement is proposed, with which the accuracy of Eb/Io measurement is improved. According to the proposed method, a precise power control is achieved. As a result, the performance of the BER/FER of the receiver is improved and the deviation of the receiving signal power is reduced, that is, the transmission power control error is reduced.

According to the present invention, it is possible to increase the number of Eb/Io measurement samples by inserting the data symbols. By using all of the samples in each slot for the power measurement, the accuracy of Eb/Io measurement is improved and the performance of the closed loop power control is improved.

The Eb/Io measurement error can be substantially reduced by using the two step estimation. The carrier estimation error can also be reduced by the proposed two step estimations. The present invention is very advantageous compared with the method which uses the carrier estimated values in the first stage for Eb/Io measurement. Further, since the over estimation of Eb/Io for low S/I or higher order diversity can be reduced according to the present method, it is possible to control the transmission power to a lower value than in the case where the transmission power is estimated by only Eb/Io.

Further, the estimation error within one of sample groups is prevented from influencing the estimation of the whole slot by dividing the samples to the groups. Therefore, the influence of such estimation error is limited to the related group.

Further, according to the present invention, it is possible to reduce the amount of complicated calculations by combining the carrier estimation processing and the Eb/Io measurement processing.

The hard decision in the pre-detection is based on the diversity combining signal. The reliability of the decided data is improved by the use of the diversity combining signal for the pre processing. Since the modulation which may influence the signal similarly to the fading distortion is removed by using the usual symbol interpolation in the first stage, carrier synchronization having no hang-up phenomenon can be achieved.

Further, the carrier synchronizing method according to the present invention can be applied to carrier synchronization having an open loop structure which uses a free-running oscillator for mixing a receiving signal in a baseband signal. Therefore, it is possible to prevent the PLL performance from lowering into deep fading.

Further, the present invention proposes the novel carrier synchronizing method for coherent detection for reducing carrier estimation error by using the second stage carrier estimation. The proposed second stage carrier estimation improves the reliability and accuracy in estimation and improves the BER performance of the receiver.

In the carrier estimation using the usual pilot interpolation, there is a defect that, when the number of pilot symbols for each slot is small and the ratio of signal power to interference power is small, under-estimation may occur. According to the present invention, it is possible to reduce the number of required pilot symbols or increase the time interval between pilot symbols compared with the usual pilot symbol interpolation.

Further, in the present invention, it is possible to substantially reduce the influence of concomitant noise or the influence of interference against the estimation by averaging the samples in respective groups in the second stage.

Further, the present system can improve the accuracy of the estimation channel function and can follow fading which varies very fast.

Since the proposed second stage estimation is based on the samples in each slot with a slight delay in processing, the proposed method can be used in a discontinuous transmission in a case of lower data rate (sub rate).

The system proposed by the present invention is very suitable to a digital device and satisfies requirements for realizing any digital system.

What is claimed is:

1. A cellular mobile telephone system comprising at least one cell device and at least one mobile device which mutually transmit and receive an information signal, said cell device being provided with a channel estimation circuit which estimates carriers of receiving signals received from said at least one mobile device, each channel estimation circuit comprising:
    a first estimation circuit which performs a first stage carrier estimation using pilot symbols having a known pattern, said pilot symbols being disposed in a corresponding receiving signal, said first estimation circuit thereby producing first stage estimated carrier signals;
    a pre-detection circuit which receives said first stage estimated carrier signals and produces a data symbol train corresponding to said corresponding receiving signal in response thereto; and
    a second estimation circuit which receives said data symbol train and said pilot symbols and performs a second carrier estimation with respect to said corresponding receiving signal, said second estimation circuit producing second stage estimated carrier signals as a result.

2. A cellular mobile telephone system as claimed in claim 1,
    wherein said cell device further comprises a diversity combiner circuit which coherently combines said corresponding receiving signal with said second stage estimated carrier signals.

3. A cellular mobile telephone system as claimed in claim 1,
    wherein each channel estimation circuit further comprises:
        an Eb/Io calculator, said Eb/Io calculator receives said second stage estimated carrier signals and said pilot symbols and produces an Eb/Io output in response thereto; and
        a power controller which receives said Eb/Io output and generates a power adjustment command corresponding to a deviation between said Eb/Io output and a threshold Eb/Io output.

4. A cellular mobile telephone system as claimed in claim 3, wherein said mobile device comprises another power control which receives said power adjustment command and regulates a power of a transmission signal produced by said mobile device in response to said power adjustment command.

5. A cellular mobile telephone system as claimed in claim 1, wherein said information signal is transmitted and received by using a code division multiple access (CDMA) spread spectrum communication signal.

6. A cellular mobile telephone system as claimed in claim 1, wherein:
    one of said first estimation circuits and one of said second estimation circuits is provided for each communication path of a channel of said corresponding receiving signal; and
    said pre-detection circuit includes a phase and amplitude adjustment circuit which adjusts the amplitude and phase of said first stage estimated carrier signals thereby producing adjusted signals a diversity combining circuit which coherently combines said adjusted signals to produce combined signals and a multiplexor which combines said combined signals with said pilot symbols.

7. A cellular mobile telephone system as claimed in claim 6, wherein each channel estimation circuit further comprises:
    a signal to interference estimator which receives said second stage estimated carrier signals and produces estimated signal to interference values;
    a signal to interference calculator which receives said estimated signal to interference values and produces a signal to interference ratio in response thereto:
    an Eb/Io calculator which receives said signal to interference ratio and calculates an Eb/Io ratio in response thereto: and
    a power adjustment command generator which generates a control bit for a closed loop power control from Eb/Io said Eb/Io ratio.

8. A cellular mobile telephone system as claimed in claim 1,
    wherein said first carrier estimation circuit produces said first stage estimated carrier signals by interpolating a carrier of a data symbol portion other than the pilot symbols.

9. A cellular mobile telephone system as claimed in claim 1, wherein said pre-detection circuit comprises:
    a hard decision circuit which performs a hard decision on said data symbol train; and
    a multiplexor which multiplexes said data symbol train with said pilot symbols.

10. A cellular mobile telephone system as claimed in claim 9, wherein said hard decision circuit detects said data symbols by a coherent detection.

11. A cellular mobile telephone system as claimed in claim 1,
    said second estimation circuit comprises a rotation circuit which receives and rotates said data symbol train and said corresponding receiving signal to produce a rotated output a divider which divides said rotated output into a plurality of groups;
    an accumulating and averaging circuit which accumulates and averages each of said groups thereby producing accumulated and averaged sample values; and
    an interpolator which interpolates said accumulated and averaged sample values thereby producing said second stage estimated carrier signals.

12. A cellular mobile telephone system as claimed in claim 11,
    wherein said rotation circuit multiplies said data symbol train and said corresponding receiving signal with a conjugate value or with said pilot symbols thereby removing modulation of said receiving signal.

13. A cellular mobile telephone system as claimed in claim 11,
    wherein said divider divides said rotated output to approximate signals in respective groups to quasi static signals, in periods of said respective groups.

14. A cellular mobile telephone system as claimed in claim 11,
    wherein said accumulating and averaging circuit calculates the estimated carrier values of the respective groups by using the accumulation and averaging of the samples to reduce an influence of accompanying noise and interference to thereby improve the estimation performance.

15. A cellular mobile telephone system as claimed in claim 11,
    wherein said interpolator interpolates the estimated carrier values given by said accumulating and averaging circuit, to obtain an estimated value of the carrier signal for compensation for fading distortion, diversity-reception, multiplication for synthesis with maximum ratio and actual coherent detection.

16. A cellular mobile telephone system as claimed in claim 11, further comprising:

a signal power estimation circuit which estimates a signal power of said corresponding receiving signal by using said second stage estimated carrier signals; and an interference power estimation circuit which estimates an interference power of said corresponding receiving signal by using said rotated output and said second stage estimated carrier signals.

17. A cellular mobile telephone system as claimed in claim 16, further comprising:

an Eb/Io calculator which receives said second stage estimated carrier signals and produces a Eb/Io ratio in response thereto; and a power adjustment command generator which generates a control bit for a closed loop power control based on said Eb/Io ratio.

* * * * *

UNITED STATES PATENT AND TRADEMARK OFFICE
CERTIFICATE OF CORRECTION

PATENT NO. : 6,178,194 B1
DATED : January 23, 2001
INVENTOR(S) : Dobzica Vasic

It is certified that error appears in the above-identified patent and that said Letters Patent is hereby corrected as shown below:

Column 8,
Line 10 change: "where M=0, 1,2,...., k-1" to -- where m=0, 1, 2,....,K-1 --.

Signed and Sealed this

Fourteenth Day of August, 2001

Attest:

NICHOLAS P. GODICI
Attesting Officer
Acting Director of the United States Patent and Trademark Office